June 28, 1927.

C. E. JOHNSON 1,633,747

ELECTRIC HEATING APPARATUS

Filed July 30, 1925

2 Sheets-Sheet 1

Carl E. Johnson   Inventor

Witnesses

By Richard B. Owen

Attorney

June 28, 1927.
C. E. JOHNSON
1,633,747
ELECTRIC HEATING APPARATUS
Filed July 30, 1925
2 Sheets-Sheet 2
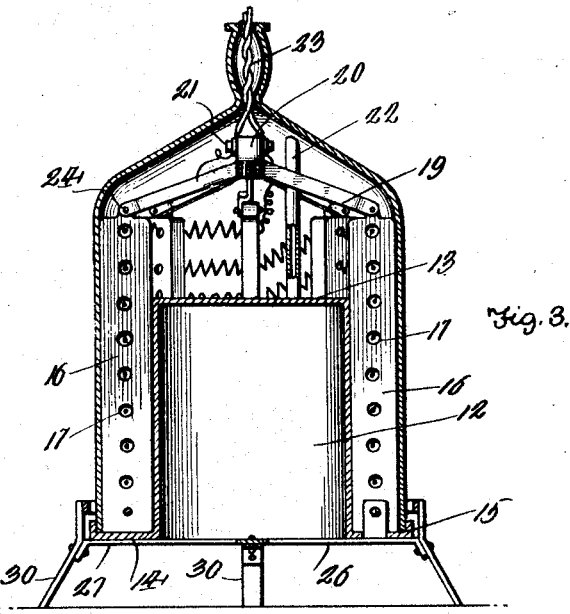
Fig. 3.
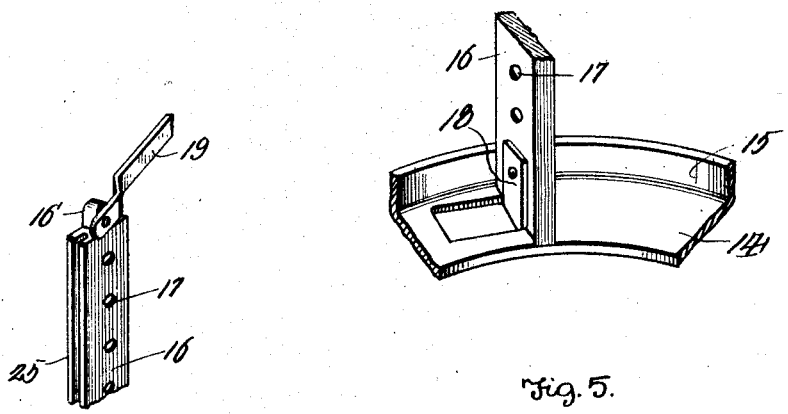
Fig. 4.
Fig. 5.
Carl E. Johnson, Inventor
Witnesses Patented June 28, 1927.

1,633,747

UNITED STATES PATENT OFFICE.

CARL E. JOHNSON, OF DETROIT, MICHIGAN.

ELECTRIC HEATING APPARATUS.

Application filed July 30, 1925. Serial No. 47,109.

This invention relates to improvements in heating apparatus and has for its prime object to provide a heater particularly adapted for heating water in bath tubs and the like.

A further object of the invention is the provision of an electric heater having interior and exterior heating surfaces to facilitate the heating of water and the like.

A still further object of the invention is the provision of an electric heater of the above character which is extremely simple and durable of construction and designed so as to quickly heat the water or other liquid matter in which it is immersed.

Other objects and advantages of this invention will become apparent as the description progresses.

Figure 1:
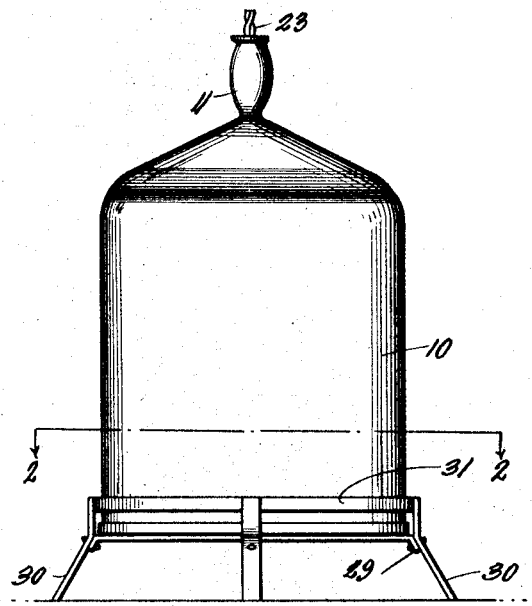
Figure 2:
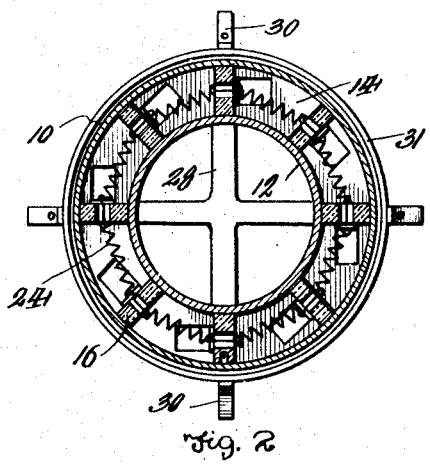

In the accompanying drawings forming a part of this specification and in which like numerals are employed to designate corresponding parts throughout the same:

Figure 1 is a side elevational view of a heating apparatus constructed in accordance with my invention, Figure 2 is a horizontal sectional view taken on the line 2—2 of Figure 1, Figure 3 is a central vertical sectional view through the apparatus, Figure 4 is a fragmentary perspective view of one of the detail elements, and Figure 5 is a similar view of a portion of the apparatus.

In the drawings, wherein for the purpose of illustration is shown the preferred embodiment of my invention, the numeral 10 generally designates the outer casing of my improved apparatus, embodying a cylindrical body provided with a conical cover member upon the upper end of which is formed a sleeve 11. The lower extremity of this outer casing 10 is open so as to engage an inner co-acting casing 12. This inner casing is of cylindrical formation enclosed at the upper end by a circular cover plate 13, and arranged in spaced relation within the outer casing. Formed on the lower end of the inner casing 12 is an outwardly directed annular flange plate 14 extending outwardly so as to contact with the lower edge of the outer casing and securely fastened thereto by means of an upturned flange 15. This construction provides a pair of spaced casings arranged one within another so as to provide a substantial compartment between the upper enclosed ends of the casings and an annular chamber between the side walls of these casing members.

Securely mounted in the annular chamber formed between the walls of the inner and outer containers, are a plurality of vertically positioned support bars 16 preferably constructed of hard rubber or other insulating material and arranged at spaced intervals in the chamber. Formed on the upper extremities of these support bars are upwardly directed lugs 16 apertured to engage suitable bracing apparatus. Each of the support bars 16 is provided with a plurality of transverse openings 17 arranged in vertical alignment so as to readily receive a heating element. The lower extremities of the support bars 16 are secured in position by vertically extending ears 18 struck out from the annular flange plate 14 and bent to an angle of 90° so as to contact with the lower side of the bars. The bars are secured to the ears 18 by rivets or in any suitable manner so as to prevent displacement thereof. The upper ends of the support bars 16 are held securely in position by means of a support frame 19 comprising a plurality of radially directed arms offset adjacent their outer extremities and connected to the members 16' by bolts or rivets. The central portion of the frame 19 carries a connection box 20 carrying a pair of oppositely disposed terminal screws 21 so as to receive the terminals of the electric heating element.

An air conducting tube 22 extends from the upper portion of the inner casing 12 to the closure member of the outer casing 10, this tube being secured to the casing cover so as to permit the escape of air from the inner casing when the heater is immersed in a liquid.

A pair of electric current conducting wires 23 are inserted through the sleeve 11 and secured to the terminal box 20 by means of the terminal screws 21. An electric heating coil 24 also connects with the terminal box 20 and is arranged in a substantially spiral manner in the casing chamber, this coiled resistance wire being inserted through the openings 17 formed in the insulating bars 15. One of the insulating bars 16 is provided on its outer longitudinal edge with a groove 25, as clearly shown in Figure 4, one end of the resistance wire 24 extending through this groove to complete the connection, this end of the wire being secured to the opposite terminal screw. This arrangement permits even distribution of the heating element and avoids the possibility of short circuiting the coil, due to the provision of the insulating support bars through which the coil is extended.

The apparatus is supported upon a suitable stand 26 embodying a bottom plate composed of an annular flange plate 27 complementary with the flange plate 14 and secured thereto, this plate 27 being adapted to tightly enclose the lower portion of the structure. The central portion of the bottom plate 26 comprises four radially extending arms 28, thus forming a light and durable bottom plate. The peripheral edges of the bottom plate are provided with angular projections 29 preferably four in number, to which are secured angular supporting legs 30, the upper portions of these legs extending somewhat above the bottom plate 26 and supporting a guard ring 31.

It is apparent, from the foregoing description and drawings, that an electric heater of compact and durable construction is provided embodying at the same time utmost simplicity in design so that the device may be saleable at a comparatively low cost. The device is particularly adaptable for heating the water in bath tubs obviating the necessity of firing a boiler and at the same time permitting more efficient control of the temperature. The particular construction of the apparatus provides an unusually large heating surface thereby facilitating the use of the device and thus obtaining the greatest efficiency from the heating element.

It is to be understood that the form of my invention herewith shown and described is to be taken as the preferred example of the same and that various changes as to the size, shape and arrangement of parts may be resorted to without departing from the spirit of the invention, or the scope of the subjoined claims.

Having thus described my invention, I claim:

1. A device of the class described including, in combination, a cylindrical outer casing, a cylindrical inner casing, a plurality of support bars interposed between the inner and outer casings, a supporting stand formed on the lower end of the casings, a brace frame connected to the upper extremities of the support bars, and a heating element arranged spirally between the inner and outer casings and extending through suitable apertures formed on the said bars.

2. An electric heater comprising, in combination, an outer cylindrical casing having a conical cover member, an inner cylindrical casing enclosed at the upper end and provided with an annular flange at the lower end, the said flange connecting with the outer casing, a support stand secured to the said annular flange, a plurality of vertically extending support bars mounted between the inner and outer casing members, a bracing frame mounted in the upper portion of the outer casing connecting with the upper extremities of the support bars, and an air conducting pipe secured to the inner and outer chambers and adapted to exhaust the air from the inner chamber; and a heating element secured to the brace frame extending spirally within the outer casing through apertures formed in the support bars.

3. An electric heater comprising, in combination, an outer casing provided with a sleeve on the upper end thereof, an inner casing arranged in spaced relation with the outer casing, an annular flange formed on the inner casing and connecting with the outer casing, a support stand secured to the lower ends of the casings, an exhaust pipe secured to the said casings, a support frame mounted in the outer casing comprising a plurality of radially directed arms secured to the upper ends of the support bars, the lower extremities of the support bars being secured by ears struck from the inner casing flange, and a heating element secured to the support frame extending through suitable apertures formed in the support bars.

4. In a device of the kind described, a cylindrical inner casing, a cylindrical outer casing concentric with the inner casing and provided with a closed top having a centrally disposed neck, said inner casing likewise having a closed top and being provided with a flange at its bottom to close the space between the inner and outer casings, a series of spaced vertical bars arranged between the inner and outer casings and bearing against said casings, said bars being each provided with a row of vertically spaced openings and each having an ear at its upper end, one of said bars having a longitudinal groove in the edge adjacent the inner casing, frame bars extending radially inward from said ears and inclined upwardly therefrom, a connection box supported by the inner ends of the frame bars, a pair of spaced terminal screws carried by said box, lead wires extending from said screws through said neck, a resistance element extending around the casings through the openings in the vertical bars and having one end connected to one of the terminal screws, the remaining end of said element extending upwardly through the groove in the frame bar and connected to the other terminal screw, and a tube extending from the top of the inner casing and opening through the top of the outer casing.

In testimony whereof I affix my signature.

CARL E. JOHNSON.